United States Patent
Nonni et al.

(10) Patent No.: US 7,992,315 B2
(45) Date of Patent: Aug. 9, 2011

(54) APPARATUS FOR MEASURING AND CHECKING INTERNAL DIMENSIONS OF MECHANICAL PIECES

(75) Inventors: Federico Nonni, Bologna (IT); Guido Golinelli, Bologna (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 353 days.

(21) Appl. No.: 12/299,442

(22) PCT Filed: May 7, 2007

(86) PCT No.: PCT/EP2007/054388
§ 371 (c)(1),
(2), (4) Date: Nov. 3, 2008

(87) PCT Pub. No.: WO2007/128805
PCT Pub. Date: Nov. 15, 2007

(65) Prior Publication Data
US 2010/0229414 A1 Sep. 16, 2010

(30) Foreign Application Priority Data
May 8, 2006 (IT) .................................. BO06A0336

(51) Int. Cl.
*G01B 3/46* (2006.01)
(52) U.S. Cl. ............................... 33/558; 33/542; 33/560
(58) Field of Classification Search .................... 33/556, 33/557, 558, 559, 560, 561, 827, 831, 542, 33/543, 550, 555
See application file for complete search history.

(56) References Cited

U.S. PATENT DOCUMENTS

| | | | |
|---|---|---|---|
| 3,557,462 A * | 1/1971 | Kiewicz et al. | 33/556 |
| 3,594,694 A | 7/1971 | Clark | |
| 3,823,484 A * | 7/1974 | Dunn | 33/560 |
| 4,348,814 A | 9/1982 | Possati et al. | |
| 4,571,839 A | 2/1986 | Burton | |
| 5,189,808 A * | 3/1993 | Evans et al. | 33/836 |
| 6,001,066 A | 12/1999 | Canfield et al. | |
| 6,003,237 A * | 12/1999 | Sarr et al. | 33/542 |
| 6,222,436 B1 * | 4/2001 | Golinelli | 336/136 |
| 6,760,980 B1 | 7/2004 | Golinelli | |
| 6,772,527 B1 * | 8/2004 | Butter et al. | 33/503 |
| 7,282,017 B2 * | 10/2007 | Jordil et al. | 483/16 |
| 7,337,551 B2 * | 3/2008 | Roth et al. | 33/559 |
| 7,412,778 B2 * | 8/2008 | Golinelli | 33/543 |
| 2002/0032529 A1 | 3/2002 | Duhon | |
| 2003/0028182 A1 | 2/2003 | Abboud et al. | |
| 2003/0148672 A1 | 8/2003 | Henry et al. | |
| 2003/0151596 A1 | 8/2003 | Moyne et al. | |
| 2003/0228799 A1 | 12/2003 | Machado et al. | |

FOREIGN PATENT DOCUMENTS

| | | |
|---|---|---|
| GB | 2412396 | 9/2005 |
| WO | WO 99/18496 | 4/1999 |
| WO | WO 2006/037749 | 4/2006 |
| WO | WO 2007/096403 | 8/2007 |

* cited by examiner

Primary Examiner — Amy Cohen Johnson
(74) Attorney, Agent, or Firm — Dickstein Shapiro LLP

(57) ABSTRACT

A plug gauge (1) includes a support and protection system that defines a longitudinal axis with a handle (2) closed by a cap (13) that includes electronic devices for the wireless transmission of electrical signals representative of a dimension to be checked, and a probe (6) including a measuring armset coupled with a transducer for generating electrical signals. The probe is connected to the cap of the handle by means of an interface element (8) that includes mechanical references to prevent rotations of the probe with respect to the handle about the longitudinal axis.

30 Claims, 13 Drawing Sheets

APPARATUS FOR MEASURING AND CHECKING INTERNAL DIMENSIONS OF MECHANICAL PIECES

TECHNICAL FIELD

The present invention relates to an apparatus for measuring and checking a mechanical piece including a support and protection structure that defines a longitudinal axis of the apparatus and includes a first connector; a probe connected to the support and protection structure, that includes at least one armset with at least one feeler adapted for contacting the mechanical piece to be checked; at least one transducer adapted for generating electrical signals representative of displacements of said at least one feeler; and a second connector adapted for cooperating with the first connector.

The present invention also relates to an apparatus for measuring and checking a mechanical piece including a support and protection structure that defines a longitudinal axis of the apparatus and includes a first connector; a probe that includes at least one armset with at least one feeler adapted for contacting the mechanical piece to be checked and a mechanical transmission system; at least one transducer adapted for generating electrical signals representative of displacements of said at least one feeler; a second connector connected to said at least one transducer and adapted for coupling the first connector; and a wireless transmission system of the electrical signals, including at least one battery and an emitting device.

There are known checking apparatus, for examples gauges of the so-called "plug" type, for the dimensional and shape checking of mechanical pieces.

Patent U.S. Pat. No. 4,348,814 discloses examples of such gauges, wherein a measuring armset connected to the support includes two feelers fixed to movable arms in diametrical opposite positions, for contacting the surface of a hole to be checked. A transducer detects mutual displacements between the movable arms and provides for electrical signals indicative of the mutual position of the feelers, through the wires of a cable, to external display and processing devices.

There are also known wireless plug gauges, wherein signals representative of the dimension to be checked and generated by the transducer are wirelessly transmitted to external display and processing units.

The known plug gauges can be manually operated and typically include a support and protection structure with a handle with an external surface that acts as handgrip for being used by an operator and a probe containing mechanical devices for detecting the dimensions of the hole. The probe may be separated from the main body for being replaced depending on the checking to be performed, for example depending on the nominal diameter of the hole to be checked.

U.S. Pat. No. 4,571,839 discloses an example of such manual plug gauges with detachable and replaceable probe. The illustrated plug gauge is of the electrical type with cable measurement transmission and power supply, with a hollow, tubular support and protection structure that acts as handle whereto a probe is connected. The probe, that contains a measuring cell with associated transducer and feelers, is connected to the hollow tubular structure by means of a mechanical coupling with a first screw that crosses a through hole achieved in the tubular structure and engages on a circular groove achieved on the probe. The measuring cell is locked with respect to the probe in analogous way, by means of a second screw that crosses a through hole achieved in an external circular portion of the probe and engages on a groove achieved on a support for the transducer.

The handle includes at its interior electrical cables of the transducer that are connected to external power supply electrical cables by means of corresponding connectors.

The plug gauge hereinbefore described guarantees a certain flexibility in use by virtue of the possibility of replacing the probe depending on the required checking, although such replacing operation is not particularly easy and convenient because of the utilized coupling system and the arrangement of the electrical connectors which result to be of difficult access. Moreover, the coupling between probe and handle is not particularly precise and guarantees just limited metrological performances. In fact, screw and associated groove do not prevent possible mutual rotations between probe and handle, or between transducer and probe, with a further disadvantage that the electrical wires may twist and provoke undesired stress on the transducer.

Object of the present invention is that to improve modularity and convenience in use of the known gauges, cutting down costs and enhancing metrological performances of the gauges.

This and other objects are achieved by a measuring apparatus with a connection system between probe and support and protection structure that simplifies and makes the connection more precise.

An apparatus for measuring and checking mechanical pieces according to a first embodiment of the present invention includes a support and protection structure that defines a longitudinal axis of the apparatus and includes a first connector; a probe connected to the support and protection structure, that includes at least one armset with at least one feeler adapted for contacting the mechanical piece to be checked; at least one transducer adapted for generating electrical signals representative of displacements of said at least one feeler; and a second connector adapted for cooperating with the first connector. The apparatus according to the invention is characterized by including an interface element, connected in a removable way to at least one of said support and protection structure and probe and adapted to refer and connect in a rapid way the probe to the support and protection structure.

The checking apparatus of the present invention includes a connection system between the support and protection structure and the probe with an interface element including first mechanical references to prevent rotation of the probe about the longitudinal axis with respect to the interface element and second mechanical references to prevent rotation of the support and protection structure about the longitudinal axis with respect to the interface element. Seats Corresponding to the mechanical references of the interface element are present on components of the probe and of the support and protection structure.

An apparatus for measuring and checking mechanical pieces according to a second embodiment of the present invention includes a support and protection structure that defines a longitudinal axis of the apparatus and includes a first connector; a probe that includes at least one armset with at least one feeler adapted for contacting the mechanical piece to be checked and a mechanical transmission system; at least one transducer adapted for generating electrical signals representative of displacements of said at least one feeler; a second connector connected to said at least one transducer and adapted for coupling the first connector; and a wireless transmission system of said electrical signals, including at least one battery and an emitting device. The apparatus according to the second embodiment of the invention is characterized in that said apparatus further includes a connection system between the support and protection structure and the probe, connected in a removable way to at least one of said support and protection structure and probe.

The connection system between the support and protection structure and the probe of the checking apparatuses according to the present invention guarantees quick interchangeability of different types of probes on the same handle or on different handles for different types of checking, and assures electrical stability and reliability of the connection, protection of the connectors from mechanical stresses deriving from the normal use of the gauge in more or less aggressive environments, liquid tightness so that to protect the internal, sensitive parts of the probe and handle.

The combination of the above mentioned connection system and of a wireless transmission system, in the preferred embodiments of the invention, guarantees particular flexibility in use and management of the components, that can be assembled and utilized in an extremely simple and rapid way.

The invention will be described in detail with reference to the enclosed sheets of drawings, given by way of non limiting examples only, wherein.

Figure 1:
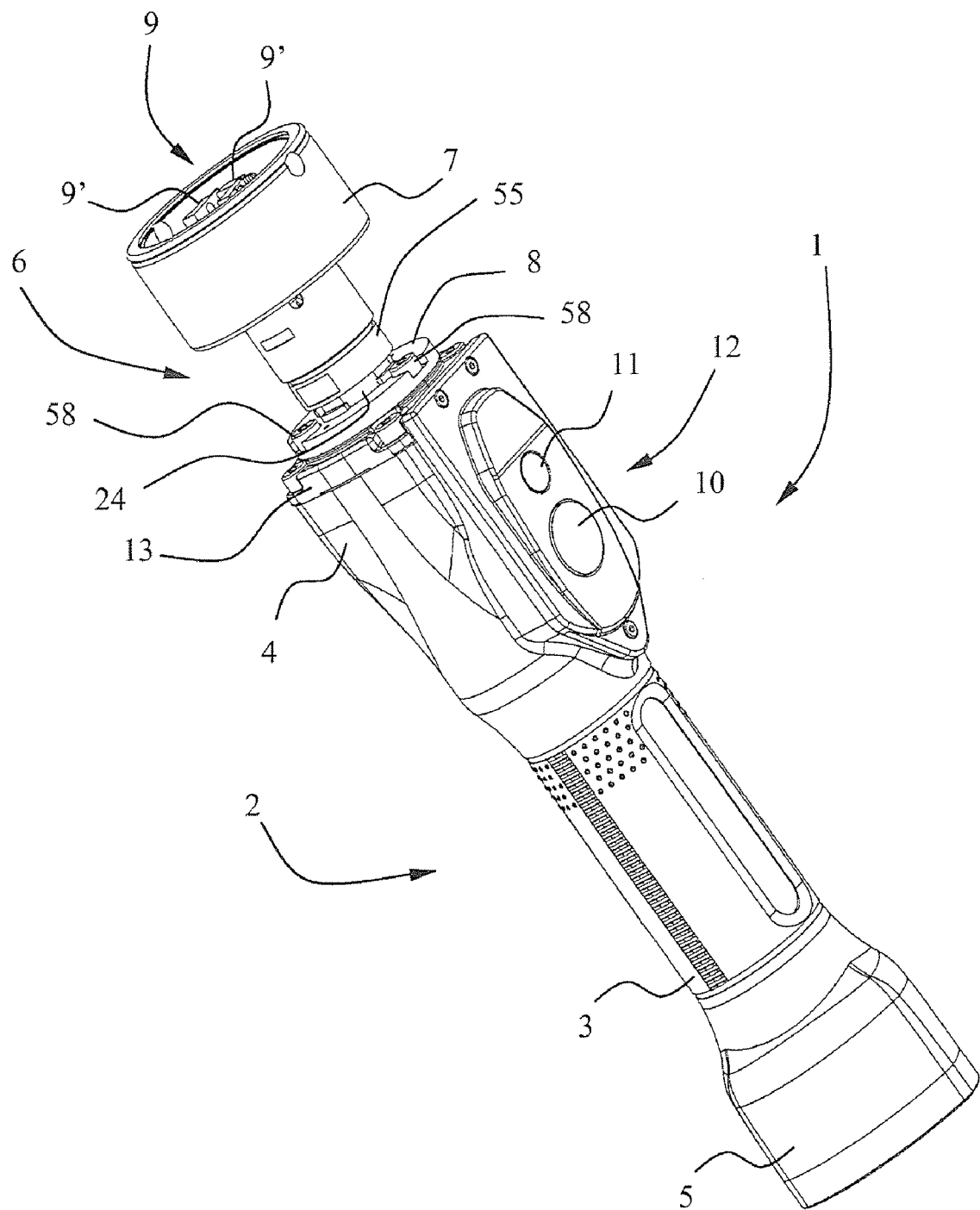
FIG. 1 shows a perspective view of a plug gauge according to a first preferred embodiment of the invention with some details omitted for the sake of simplicity.
Figure 2:
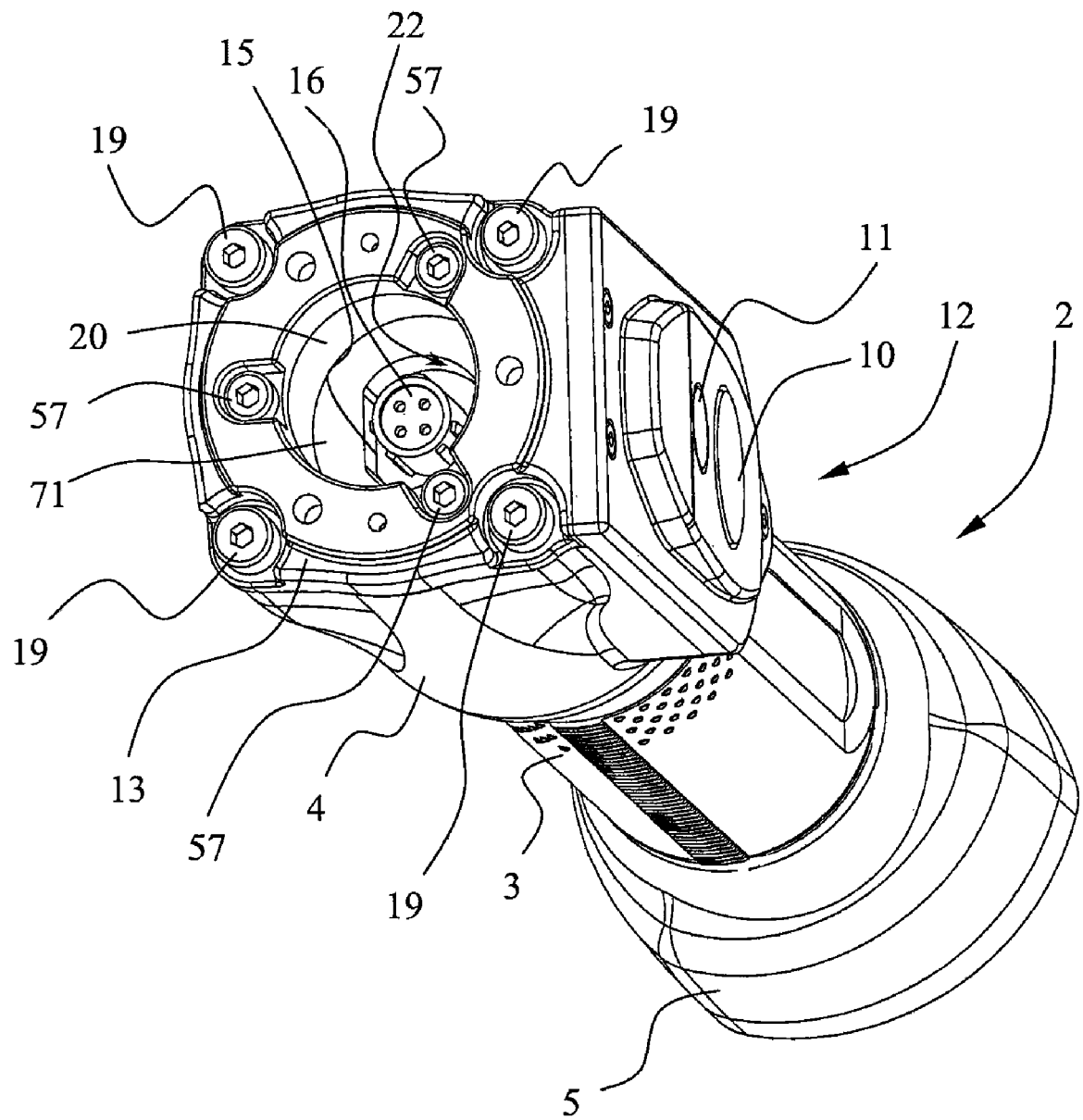
FIG. 2 shows a perspective view of the handle of the plug gauge of FIG. 1, according to a different angular position and on a different scale with respect to FIG. 1.
Figure 3:
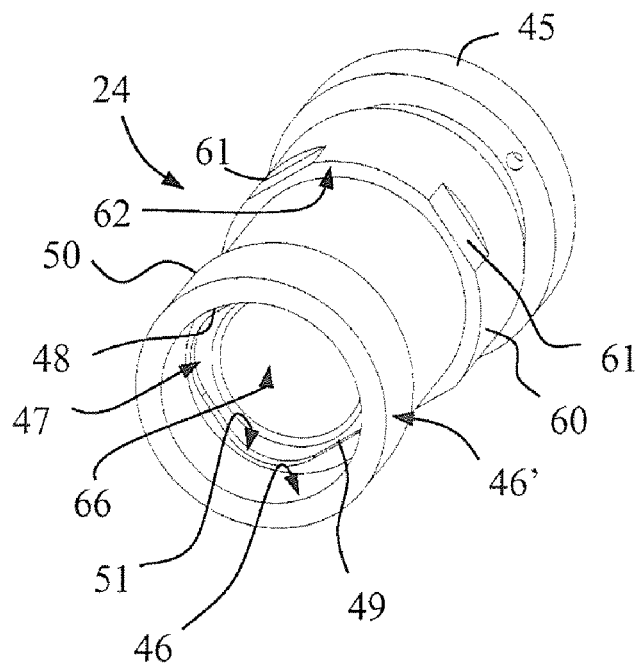
FIG. 3 shows a perspective view of a component of the plug gauge nosepiece of FIG. 1, according to a different angular position and on a different scale with respect to FIG. 1.
Figure 4:
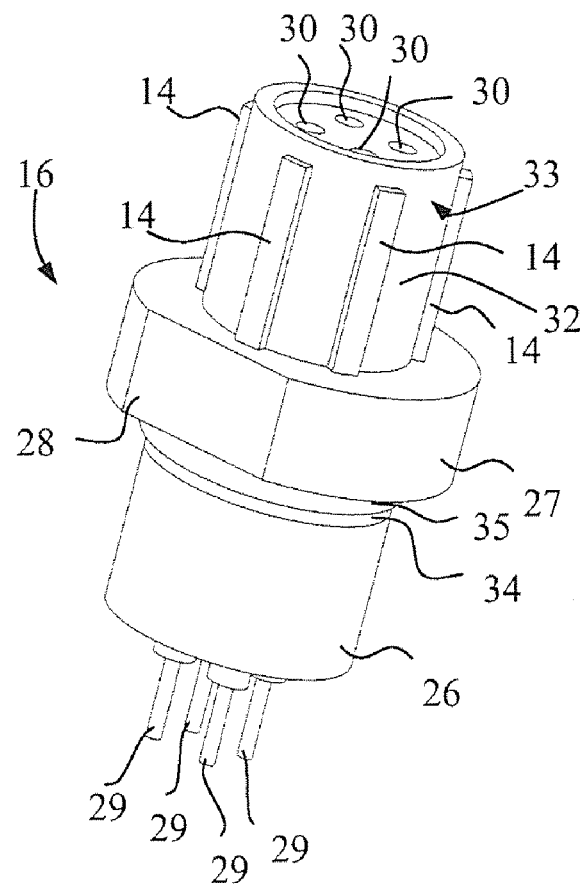
FIG. 4 shows a perspective view of a first connector of the plug gauge of FIG. 1, according to a different angular position and on a different scale with respect to FIG. 1.

FIG. 1 shows an electrical gauge of the plug type 1 for the manual checking of internal diametral dimensions with wireless transmission of measurement signals. The plug gauge 1 includes a support and protection structure with a handle 2 that defines a longitudinal axis of the plug gauge 1 and is shaped in such a way that has a central portion 3 with reduced diameter with respect to a first 4 and a second 5 end portion. The central portion 3 has ergonomic shape for the manual use of the gauge. In particular, FIG. 2 shows the support and protection structure with the handle 2, the front part of which—at the first end portion 4—is protected by a closure element or cap 13 with a central opening 71 that makes a first connector (handle-side) 16 accessible. The handle 2 contains a push-button group 12, including a push-button 10 for controlling the plug gauge 1, i.e. for manually selecting by an operator the plug gauge function required, as for example the turning on and turning off of the plug gauge, or the transmission of signals representative of the checked dimension to an external processing and display device not shown in the figures. Next to the push-button 10 there is positioned a display LED 11 that shows the status of the plug gauge and/or the selected function by means of the push-button 10.

A probe 6 is connected to the cap 13 of the handle 2 by means of an interface element 8. The connection between the probe 6 and the handle 2 will be hereinafter illustrated in more detail with reference to the FIGS. 2-7.

The probe 6 includes a main element 24 (illustrated in detail in FIG. 3), a centering nosepiece 7, locked with respect to the main element 24 by means of a ring nut 55, that houses a measuring armset 9 of a known type (only partially visible in FIG. 1) with an inductive transducer and feelers (not illustrated) connected to movable arms 9' of the measuring armset to contact the piece to be checked. The transducer, by detecting mutual movements of the arms 9', provides in a known way measurement electrical signals representative of the dimension to be checked.

The nosepiece 7 can be closed by a protection cap, not illustrated for the sake of clarity. The main element 24 is substantially cylindrically shaped with transversal cross-sections of different external diameter and is hollow for allowing electrical conductors of the transducer of the measuring armset 9 to pass. The measuring armset 9 is fixed, for example welded, to a bearing holed disk 45 of the main element 24. The main element 24 has an internal cylindrical surface 66 and a quadrangular surface 51, radiused with the former, including two seats 48, 49 for corresponding keys 37, 38 of a second connector (probe-side) 17 that will be hereinafter illustrated in detail. The difference in shape and dimension of the internal cylindrical surface 66 with respect to the quadrangular surface 51 creates an internal transversal abutment surface 47. The main element 24 further features an end portion 50, opposite to the bearing holed disk 45, with an internal surface 46 and an external surface 46', both threaded. Between the bearing disk 45 and the end portion 50, in an intermediate position, there is a central portion 60 with an abutment surface 62 and seats 61 for the interface element 8 and associated first mechanical references, more specifically antirotation keys 63, respectively, that will be illustrated in detail with reference to the FIG. 7.

The handle 2 contains, just partially visible in FIG. 2, a support element 20 for electronic devices, not visible in the figure, including circuits for processing the measurement electrical signals provided for by the transducer, circuits for managing the push-button group, circuits for wirelessly transmitting the processed signals to remote devices by means of an emitting device, and moreover circuits for managing the power supply, provided for by batteries (not visible) housed in the central part of the handle 2. The support element 2 is fixed, and the above mentioned circuits with it, by means of screws 57 to the cap 13 which is in turn fixed to the handle 2 by means of screws 19. In substance, therefore, the handle 2 contains all the necessary circuits necessary to operate the plug gauge 1, while the probe 6 contains the measurement armset with associated transducer, the feelers and the centering nosepiece.

The support element 20 features a central hole 22 with an abutment surface (not visible) and a seat 15 suitably shaped to allow the handle-side connector 16 (illustrated in detail in FIG. 4) to be inserted and positioned. The handle-side connector 16 is substantially cylindrically shaped, with a central part 27 with larger diameter with respect to a first 26 and a second 32 end portion to contact the abutment surface of the hole 22. On the central part 27 there is achieved a plane portion or mechanical reference key 28 corresponding to the seat 15 of the hole 22, that achieves a first antirotation system between the handle-side connector 16 and the handle 2, that counteracts and eliminates possible rotational thrusts on the handle-side connector 16 about the longitudinal axis and assures the proper assembly and positioning of the handle-side connector 16 with respect to the support 20 and thus to the handle 2. Between the central part 27 and the first end portion 26 there is achieved a groove 34 for positioning a gasket 35, for example of the O-ring type, for assuring tightness between the handle-side connector 16 and the support element 20, once they are coupled. The handle-side connector 16 includes at the first end portion 26 a plurality of terminals 29 for connecting to the electronic circuits contained in the handle 2 (or to electrical, power supply and transmission cables, through a printed circuit, in case of gauges with cable), and at the second end portion 32 suitably seats 30 for connecting to corresponding terminals 31 of the probe-side connector 17. At an external surface 33 of the second end portion 32 there are achieved first mechanical references or mechanical reference keys 14 for coupling to the probe-side connector 17.

Figure 5:
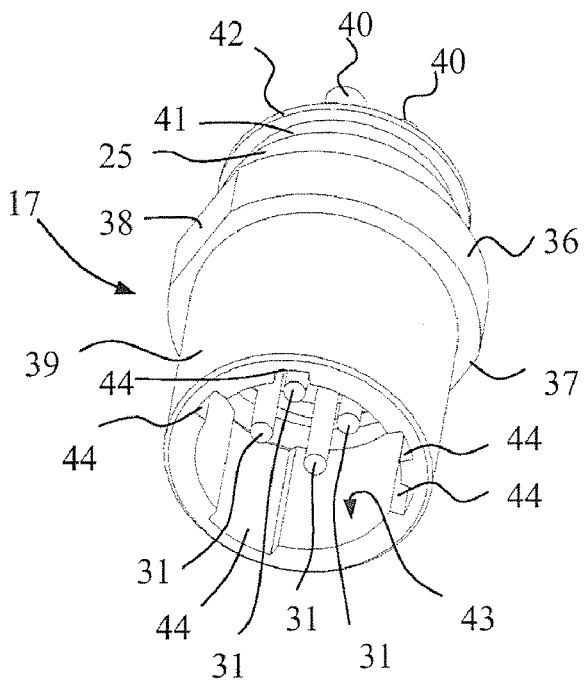
FIG. 5 shows a perspective view of a second connector of the plug gauge of FIG. 1, according to a different angular position and on a different scale with respect to FIG. 1.

In FIG. 5 there is illustrated in detail the probe-side connector 17. Likewise the handle-side connector 16, the probe-side connector 17 is also substantially cylindrically shaped with a central part 36 with larger diameter with respect to a first end portion 25 and a second end portion 39. The first end portion 25 is cylindrically shaped with a groove 41 for a gasket (not illustrated) that assures tightness between the probe-side connector 17 and the main element 24 and is closed by a disk 42 whereon there are fixed terminals 40 for the connection to the transducer. The second end portion 39 is hollow cylindrically shaped with an external threaded surface and an internal surface 43 that defines seats 44 corresponding to the mechanical reference keys 14 of the handle-side connector 16. The arrangement and shape of the keys 14 and of the corresponding seats 44 is such that there exist just one mutual angular position between the connectors 16 and 17 that allow the mutual insertion thereof, so guaranteeing their proper mutual mechanical arrangement.

Figure 6:
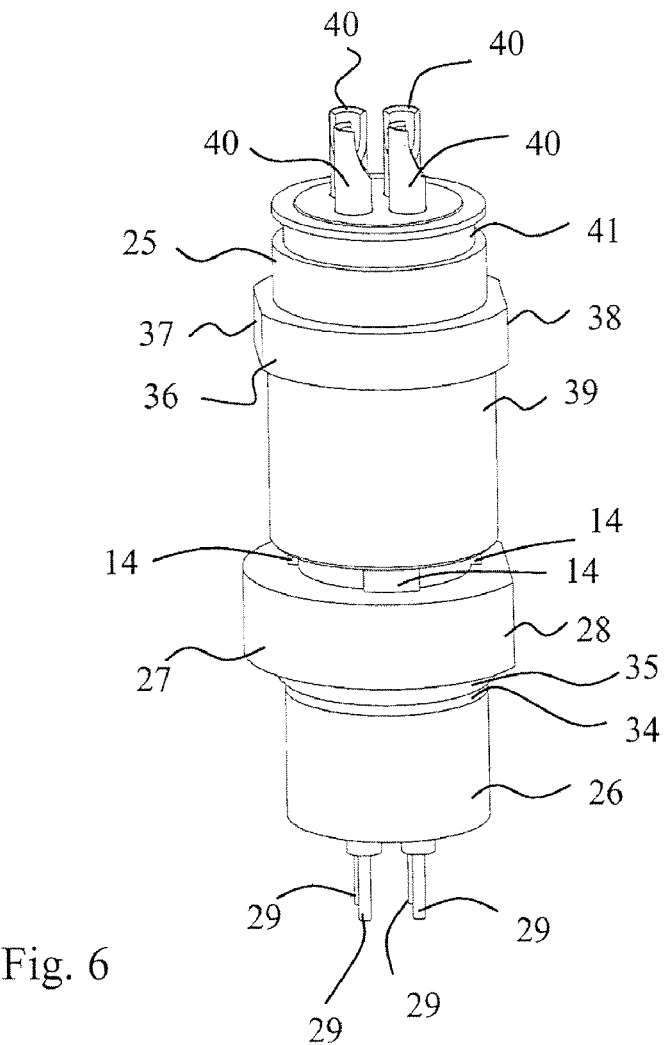
FIG. 6 shows a perspective view of the assembled connectors of FIGS. 4 and 5, according to a different angular position and on a different scale with respect to FIGS. 4 and 5.

As previously mentioned, the central part 36 of the probe-side connector 17 features two plane portions or reference keys 37 and 38, and, as the probe-side connector 17 is mounted within the main element 24, such central part 36 lies at the transversal abutment surface 47 of the main element 24, and the reference keys 37, 38 couple with the associated seats 48, 49 of the quadrangular surface 51 so achieving a second antirotation system for the probe-side connector 17 that prevents both the transducer electrical cables and handle electrical cables (in case of handle with cable transmission) to roll up. The probe-side connector 17 is kept in abutment on the internal transversal abutment surface 47 by means of a ring nut not illustrated screwed to the internal threaded surface 46 of the main element 24. In FIG. 6 there are illustrated the connectors 16 and 17 inserted one into the other. It should be noticed that the second end portion 39 of the probe-side connector 17 does not abut on the central part 27 of the handle-side connector 16, indeed the mutual insertion of the two connectors 16, 17 is also defined by the longitudinal position of the interface element 8 with respect to the main element 24. It should be further noticed that the mutual insertion of the connectors 16, 17, together with the proper arrangement and consequent action of the gaskets that are present, guarantees the connection to be waterproof.

Figure 7:
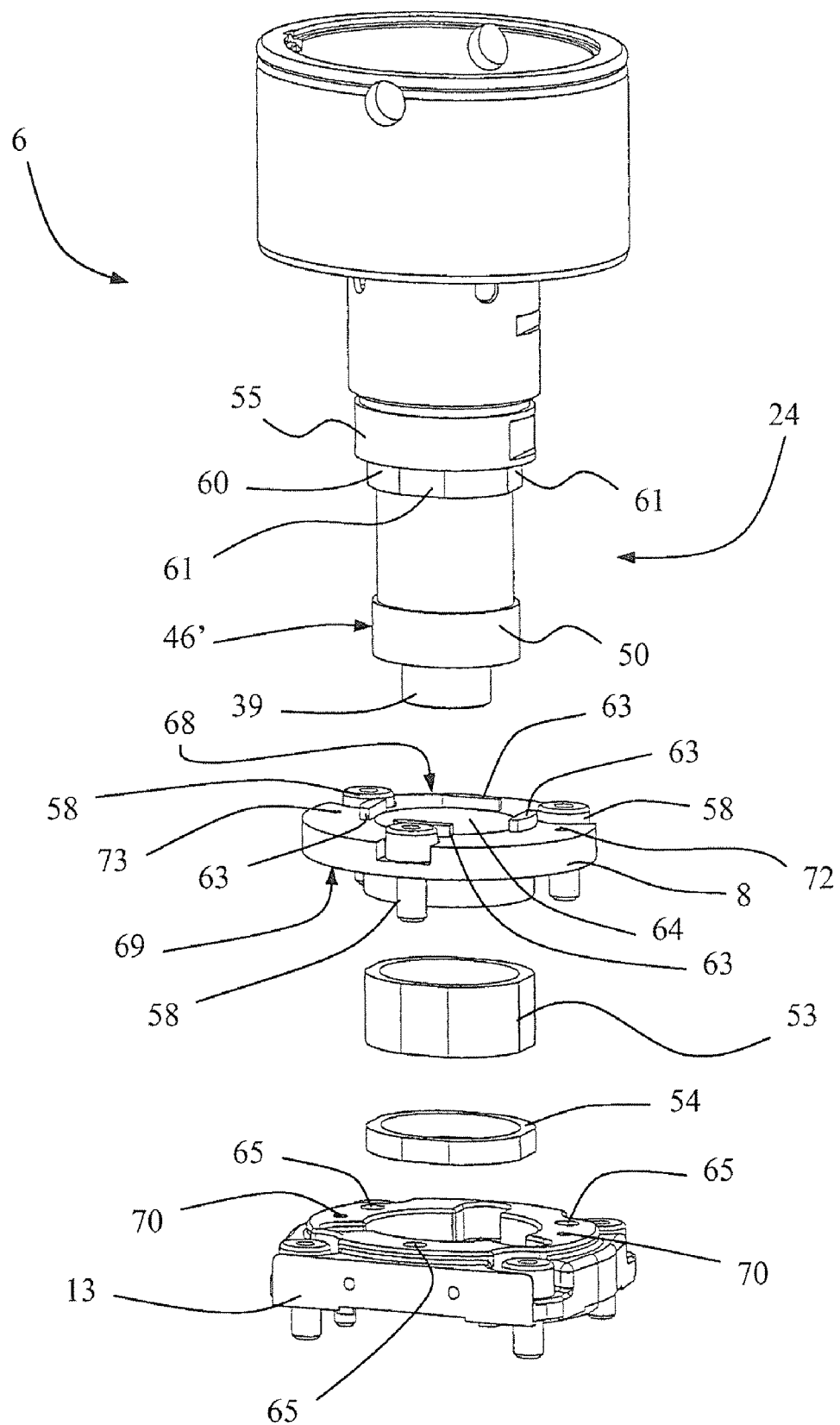
FIG. 7 shows an exploded view of a connection system between handle and probe of the plug gauge of FIG. 1, according to a different angular position and on a different scale with respect to FIG. 1.
Figure 8:
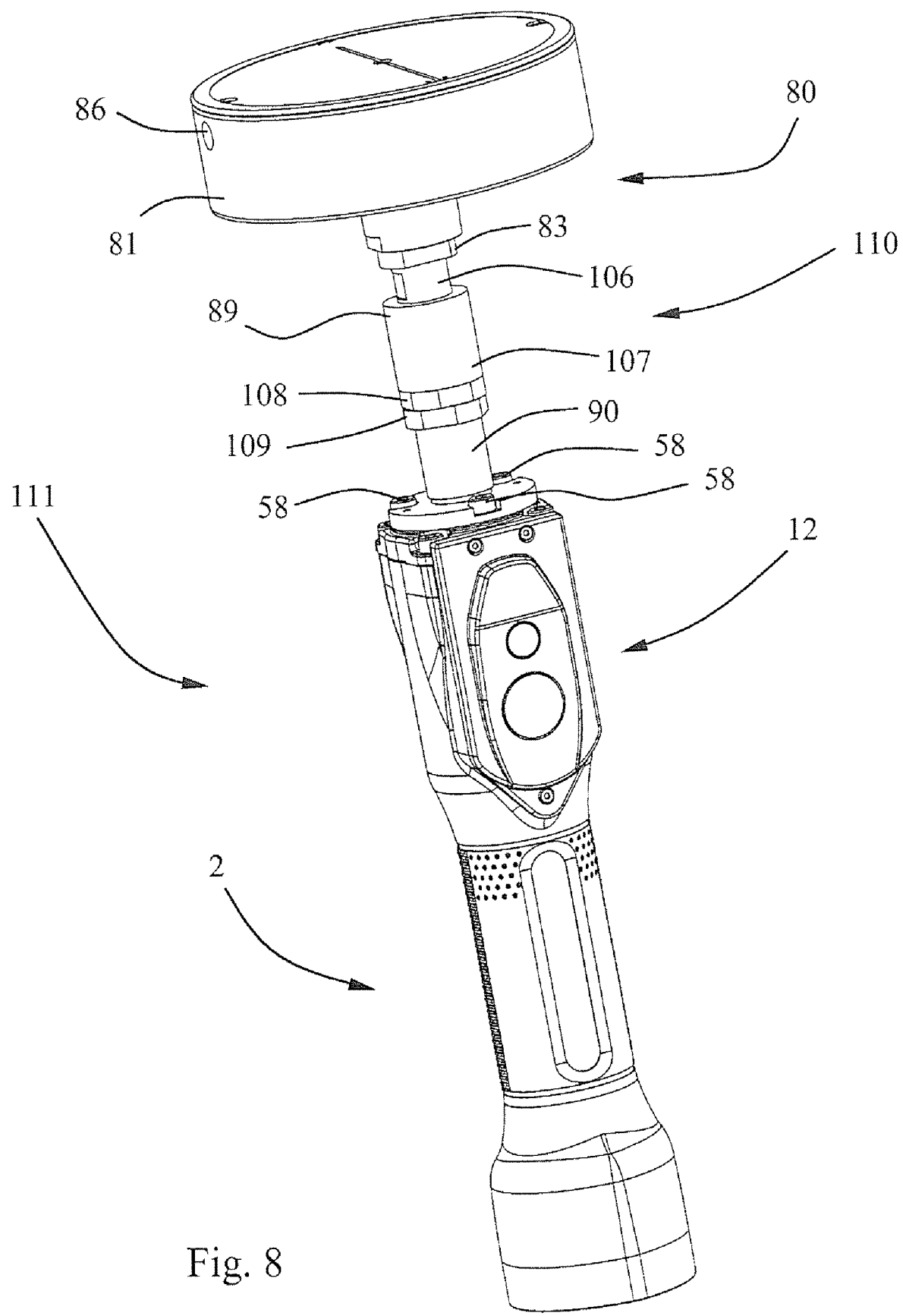
FIG. 8 shows a perspective view of a plug gauge according to a second preferred embodiment of the invention with some details omitted for the sake of simplicity.
Figure 9:
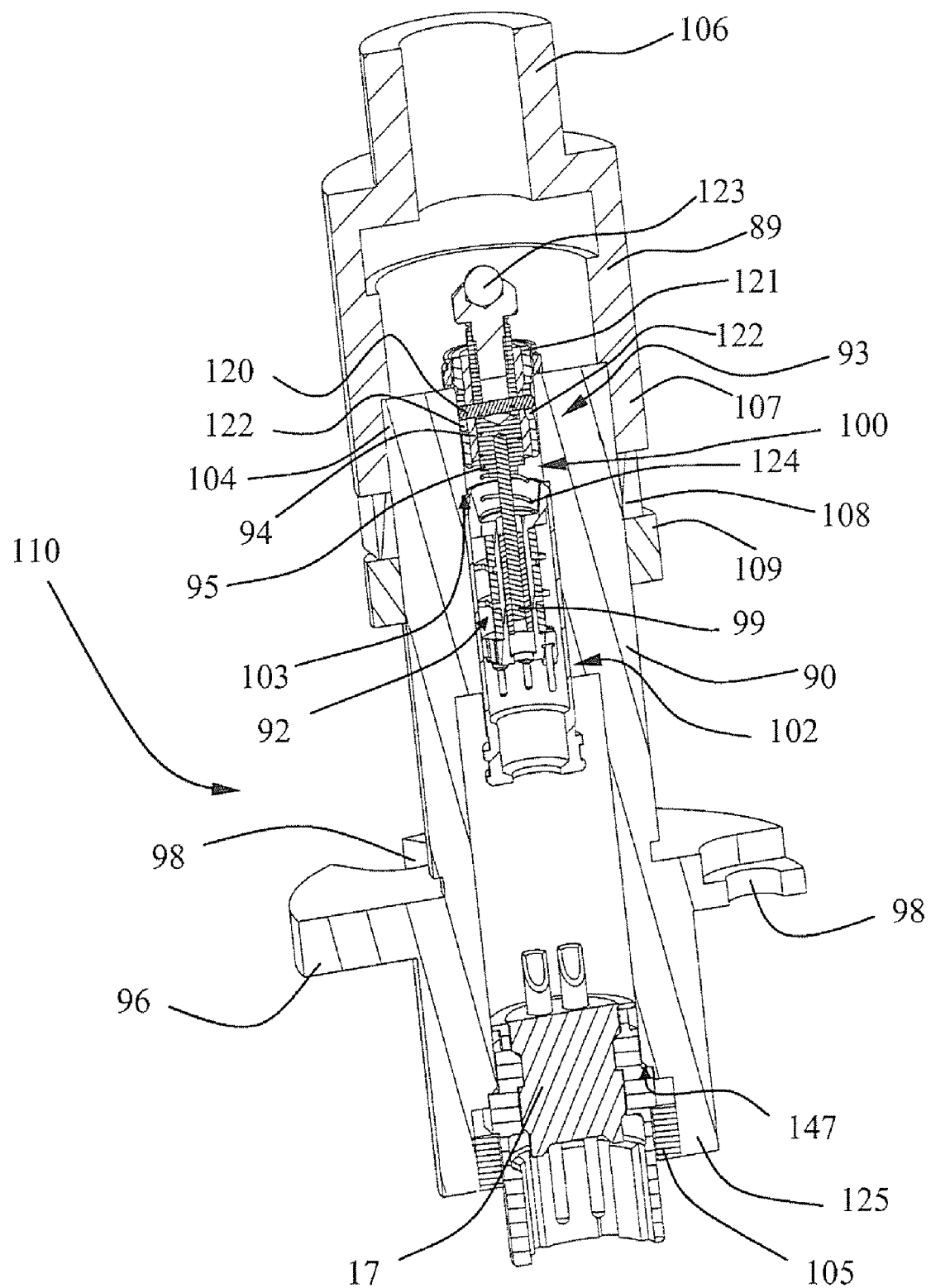
FIG. 9 shows a longitudinal cross-sectional perspective view of a connection system between handle and probe of the plug gauge of FIG. 8, according to a different angular position and on a different scale with respect to FIG. 8.
Figure 10:
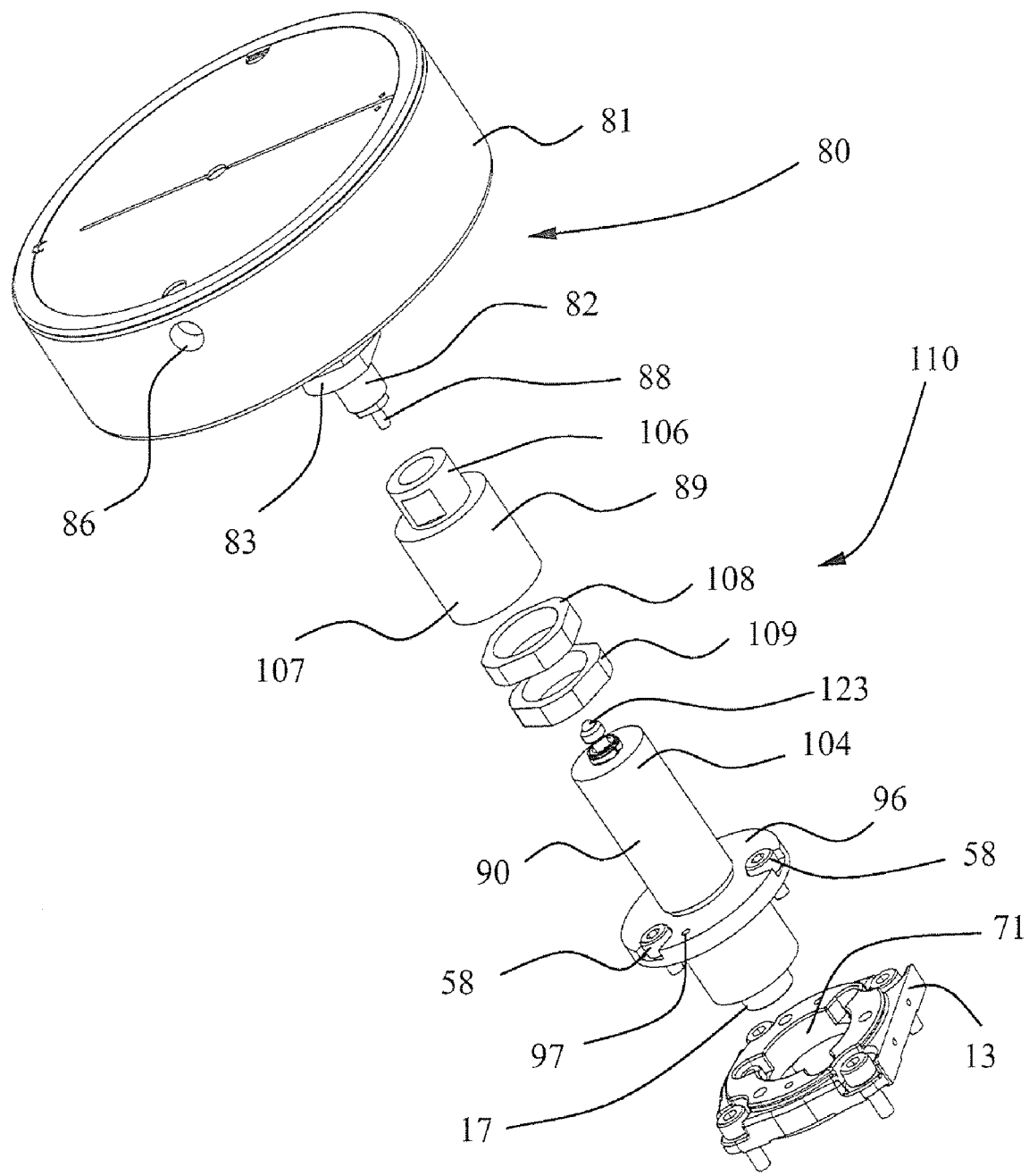
FIG. 10 shows an exploded view of some component parts of the plug gauge of FIG. 8, according to a different angular position and on a different scale with respect to FIG. 8.
Figure 11:
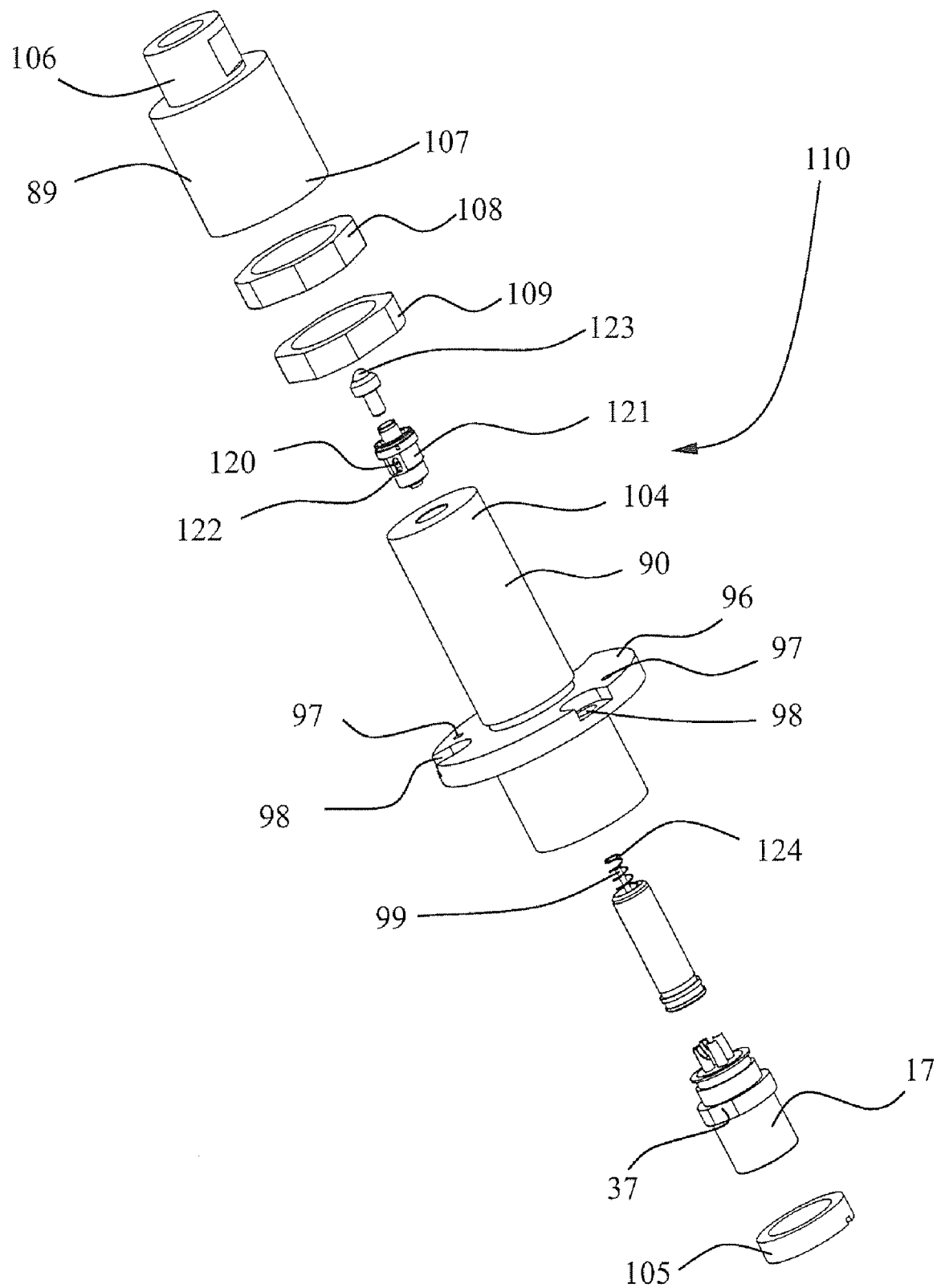
FIG. 11 shows an exploded view of a connection system between handle and probe of the plug gauge of FIG. 8, according to a different angular position and on a different scale with respect to FIG. 8.
Figure 12:
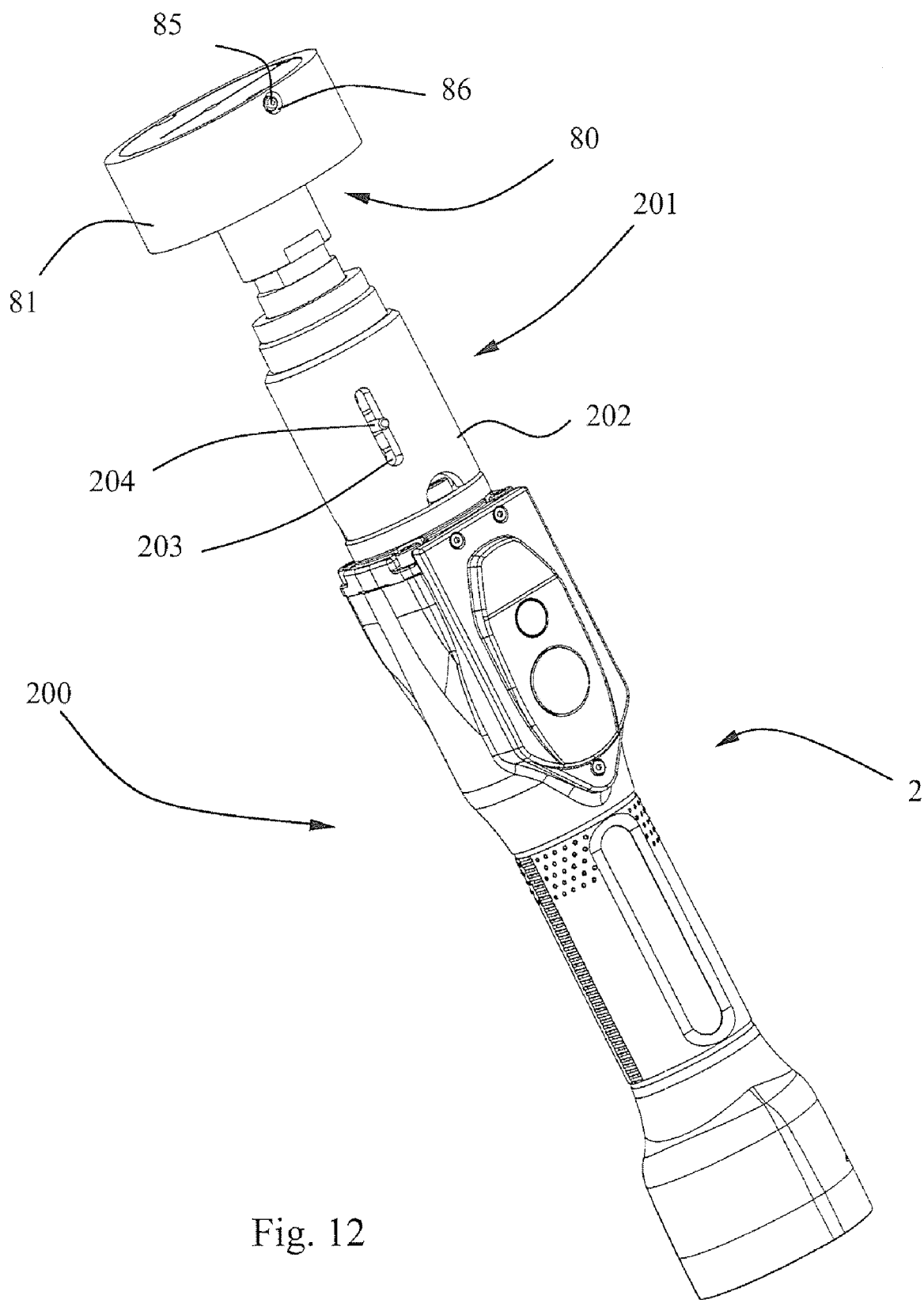
FIG. 12 shows a perspective view of a plug gauge according to a third preferred embodiment of the invention.

In FIG. 7 there are also illustrated the probe 6, the interface element 8 and the cap 13 of the handle 2. The interface element 8 is substantially disk-shaped with an upper surface 68 and a lower surface 69, a central through hole 64 for housing the probe 6, more specifically the main element 24, and three peripheral through holes arranged substantially at 120° one from the other for three screws 58. At the rim of the central hole 64, on the upper surface 68, there are positioned first mechanical references including the antirotation keys 63. The interface element 8 is locked in abutment position against the central portion 60 of the main element 24 by a ring nut 53 and a lock nut 54 screwed onto the threaded external surface 66 of the main element 24. In fact, as the central hole 64 has diameter smaller than the diameter of the central portion 60 of the main element 24, the upper surface 68 of the interface element 8 abuts on the central portion 60 and the antirotation keys 63 couple with the associated seats 61. As the arrangement of the antirotation keys 63 and of the associated seats 61—arranged at 90° one from the other—leaves four possibilities of coupling between the probe 6 and the interface element 8, it is foreseen the possibility to indicate an assembly reference on the interface element 8 and on the main element 24, for example by means of punching, in order to assure a specific arrangement. Alternatively, it is also possible to utilise a different number of antirotation keys 63 and of associated seats 61 and/or different spatial arrangement, so to leave just one possibility of coupling.

After the interface element 8 has been locked with respect to the probe 6 by means of the ring nut 53 and the lock nut 54, the probe 6 is fixed to the handle 2 by means of the interface element 8. The latter further includes second mechanical references on the lower surface 69 including two pins (of reduced dimensions and thus not visible in the FIG. 7) fixed in positions 72 and 73 diametrically opposite for associated seats 70 of the cap 13 of the handle 2 and is locked to the handle 2 by means of the screws 58 screwed in corresponding threaded holes 65 of the cap 13.

The interface element 8, by coupling with the main element 24 and with the cap 13, achieves a main antirotation system about the longitudinal axis between the probe 6 and the support and protection structure (more specifically between the probe 6 and the handle 2) and it assures the correct assembly between them. More specifically, the antirotation keys 63 with the associated seats 61 of the central portion 60 of the main element 24 assure antirotation between the probe 6 and the interface element 8, while the pins of the interface element 8, along with the screws 58, assure correct positioning and antirotation between the interface element 8 and the cap 13 of the handle 2. Possible rotational thrusts about the longitudinal axis on the probe 6 are discharged on the handle 2 through, in sequence, the interface element 8 and the cap 13. In substance, the main antirotation system prevents mutual rotations of the connectors 16 and 17 about the longitudinal axis.

It is clear that the spatial arrangement of the pins of the interface element 8, and the screws 58 as well, is consistent with the arrangement of the keys 14 of the handle-side connector 16 and the associated seats 44 of the probe-side connector 17, so achieving just one possible connection between the probe 6 and the handle 2.

Thanks to the connection system between the probe 6 and the handle 2 that has been illustrated, assembly and/or replacement operations of a probe on the associated handle results particularly precise and quick. In fact, as previously seen, the couplings between the connectors 16 and 17, and between the interface element 8 and the cap 13 as well, are univocal and do not allow a wrong connection. In practice, the operator during the assembly operations is "forced" to connect the probe 6 and the handle 2 in a correct way. Moreover, such assembly operations can be easily carried out, because the probe 6 and the handle 2 are simply coupled by pressure and are locked by screwing the three screws 58 that connect the interface element 8 to the cap 13 of the handle 2. The disassembly can be carried out in an as much easy way, by simply unscrewing the screws and then unthreading the probe 6 together with the interface element 8. Then, if it were required to separate the probe 6 from the interface element 8, it would be sufficient to unscrew the ring nut 53 and the lock nut 54 in order to unthread the interface element 8 from the main element 24, so that the interface element 8 can be utilized again on a different probe.

In FIGS. 8-11 there is illustrated a mechanical plug gauge 111 according to a second embodiment of the invention wherein a mechanical probe 80 with at least one armset and transmission elements is utilized. The plug gauge 111 further includes a support and protection structure with a handle 2, substantially identical to that illustrated with reference to the FIGS. 1-7 and therefore referenced to by the same numbers, that defines a longitudinal axis of the plug gauge 111, and a connection system 110 that will be hereinafter described in detail. The handle 2 comprises a push-button group 12 for controlling the plug gauge 111 and a cap 13 with a central opening 71 that makes a first, handle-side connector 16 accessible.

The mechanical probe 80 comprises a centering nosepiece 81 with two openings 86 (only one is visible in the FIGS. 8 and 10) for feelers (not illustrated) to pass and a connection member 82, protruding from the nosepiece 81 and locked with respect to it by means of a ring nut 83. The centering nosepiece 81 houses measuring means of a known type (not visible in the figures), coupled and referred to the connection member 82. For example, the centering nosepiece 81 advantageously houses two armsets of the parallelogram type, with a pair of parallel laminae with two reduced cross-section or fulcra, whereto the feelers are coupled. The armsets comprise inclined surfaces, e.g. forming a Vee-shaped seat, whereon a ball of a mechanical transmission system comprising a transmission rod 88 is engaged. In practice, a mutual displacement of the feelers along a measuring direction transversal to the longitudinal axis is transduced in a known way into a displacement of the transmission rod 88 along the longitudinal axis. A mechanical transmission system of this kind is partially shown in FIG. 15.

The connection member 82 is hollow for the rod 88 to pass and is externally threaded in a part protruding from the centering nosepiece 81 in order to be screwed on a corresponding first internal threaded portion 106 of an adjusting and coupling element 89.

The adjusting and coupling element 89 has a second internal threaded portion 107 adapted for being screwed on a corresponding external threaded portion 104 of an interface element 90.

In practice, the mechanical probe 80 is screwed on the adjusting and coupling element 89 until the ring nut 83 abuts on the adjusting and coupling element 89, which is in turn screwed on the interface element 90. The adjusting and coupling element 89 is locked in position by means of a ring nut 108 and a lock nut 109, that determine a longitudinal position of the adjusting and coupling element and, consequently, of the mechanical probe 80 with respect to the interface element 90. The adjusting and coupling element 89, the interface element 90, the ring nut 108 and the return ring nut 109 define the connection system 110 of the mechanical plug gauge 111 illustrated in FIGS. 8-11 between the mechanical probe 80 and the handle 2. It should be noticed that the threaded coupling between the interface element 90 and the adjusting and coupling element 89 achieves a very precise coupling which provides for the possibility of fine adjustment of the longitudinal position of the mechanical probe 80 with respect to the interface element 90, which, as will be clear in the following description, facilitates zero-setting operations of the plug gauge.

The interface element 90 is hollow-shaped with internal cylindrical portions of different diameters and/or different shape to house and refer a probe-side connector 17, a transducer 92 and guide means 93 including guide devices 94, as for example a linear bushing, for a spindle which can slide longitudinally within the interface element 90. A pin 120 is transversally inserted in the spindle 95 and engages longitudinal slits 122 of a sleeve 121 for preventing the spindle 95 from rotating about the longitudinal axis of the plug gauge 111.

The spindle 95 carries at one end a feeler 123 which is kept in contact with the transmission rod 88 by means of a thrust element, for example a spring 124, and at the other end a magnetic core 99 of the transducer 92.

More specifically, the guide means 93 are coupled in known way (for example screwed) to a first internal cylindrical portion 100 of the interface element 90, while the transducer 92 is coupled in a known way (for example glued) to a second internal cylindrical portion 102 and locked in abutment against an abutment surface 103.

Electric wires of windings (not illustrated) of the transducer 92 are connected in a known way, directly or through a printed circuit, to the probe-side connector 17.

At one end portion 125 opposite to the external threaded portion 104, the interface element 90 is shaped in a manner substantially identical to the main element 24 of the FIGS. 1-7, and further includes a quadrangular surface suitably shaped with two seats 37 (only one is visible in FIG. 11) for corresponding reference keys achieved on the probe-side connector 17 which is held in abutment against an abutment surface 147 achieved within the end portion 125 by means of a ring nut 105. The reference keys of the probe-side connector 17 and the associated seats of the quadrangular surface achieve a second antirotation system for the probe-side connector 17 substantially identical to that of the FIGS. 1-7. In practice, the probe-side connector 17 is prevented from rotating about the longitudinal axis with respect to the interface element 90, so protecting the cables of the transducer from rolling up. Integral with the interface element 90 there is achieved a flange 96 including mechanical references with pins (not visible in the figures) housed in holes 97 and with through holes 98 for screws 58 (illustrated in FIGS. 8 and 10 only). The pins and holes 98 are arranged in the same reciprocal position as in the flange 8 of FIG. 1-7 for being connected to the handle 2, more specifically to the cap 13. In practice, the connectors 16 and 17 are prevented from rotating about the longitudinal axis with respect to the handle 2 and to the interface element 90 respectively, and the coupling system 110 achieves a main antirotation system which prevents the connectors 16 and 17 from mutually rotating about the longitudinal axis.

As for the electrical plug gauge 1 illustrated with reference to the FIG. 1-7, the assembly and/or replacement operations of the mechanical probe 80 on the associated handle 2 results particularly quick and precise, thanks to the connection system 110 between the mechanical probe 80 and the handle 2.

Moreover, zero-setting operations of the plug gauge 111 are particularly precise and convenient as well. The longitudinal position of the probe 80 can advantageously be modified for achieving a zero condition, by screwing or unscrewing the adjusting and coupling element 89 on the interface element 90 till the proper longitudinal position is reached and then locking it by means of the ring nut 108 and the lock nut 109. Consequently, the longitudinal positions of the transmission rod 88, of the spindle 95 in contact therewith and of the magnetic core 99 are determined. As illustrated before, as the mechanical probe 80 is screwed on the adjusting and coupling element 89 so as the ring nut 83 contact the adjusting and coupling element 89, the longitudinal position of the mechanical probe 80 with respect to the interface element 90 is determined once the longitudinal position of the adjusting and coupling element 89 is determined.

In FIGS. 12-15 there is illustrated a further embodiment of a plug gauge 200 according to the invention. Many component parts are substantially identical to component parts of the plug gauges of the FIGS. 1-7 and 8-11, and therefore will be referenced to by the same numbers.

The plug gauge 200 is of the mechanical type and comprises a mechanical probe 80, and a support and protection structure with a handle 2 that defines a longitudinal axis of the plug gauge 200 and comprises a cap 13 with an opening that makes a first, handle side connector 16 accessible. The plug gauge 200 further includes a connection system 201 that will be hereinafter illustrated in detail with reference to FIGS. 13-15.

In practice, the plug gauge of the FIGS. 12-15 includes the same probe of the plug gauge of the FIGS. 8-11 and the same handle of the plug gauges of the FIGS. 1-7 and 8-11, but a different connection system between such probe and handle.

Advantageously, the plug gauge 200 can further comprise a protection element 202, hollow and cylindrical shaped, adapted for protecting the connection system 201 between the mechanical probe 80 and the handle 2. The protection element 202 includes a longitudinal slot 203 for an adjusting pin 204 to protrude.

The mechanical probe 80 comprises a centering nosepiece 81 with two openings 86 (only one visible in the figures) for feelers 85 to pass and a connection member 82, protruding from the nosepiece 81 and locked with respect to it by means of a ring nut 83. The centering nosepiece 81 houses measuring means of a known type, coupled and referred to the connection member 82. More specifically, the centering nosepiece 81 houses two armsets (only one is partially visible in FIG. 15) of a known type, for example of the parallelogram type, whereto feelers 85 are coupled. The armsets 84 comprise inclined surfaces forming a Vee-shaped seat whereon a ball 87 of a known mechanical transmission system comprising a transmission rod 88 is engaged.

The connection member 82 is hollow for the transmission rod 88 to pass and is externally threaded in a part protruding from the centering nosepiece 81 in order to be screwed on a corresponding first, internally threaded, end portion 215 of an interface element 205. In practice, the mechanical probe 80 is screwed on the interface element 205 until the ring nut 83 abuts on the interface element 89. The first end portion 215 of the interface element 205 is externally threaded as well, for a ring nut 230 which acts as support for the protection element 202.

Figure 13:
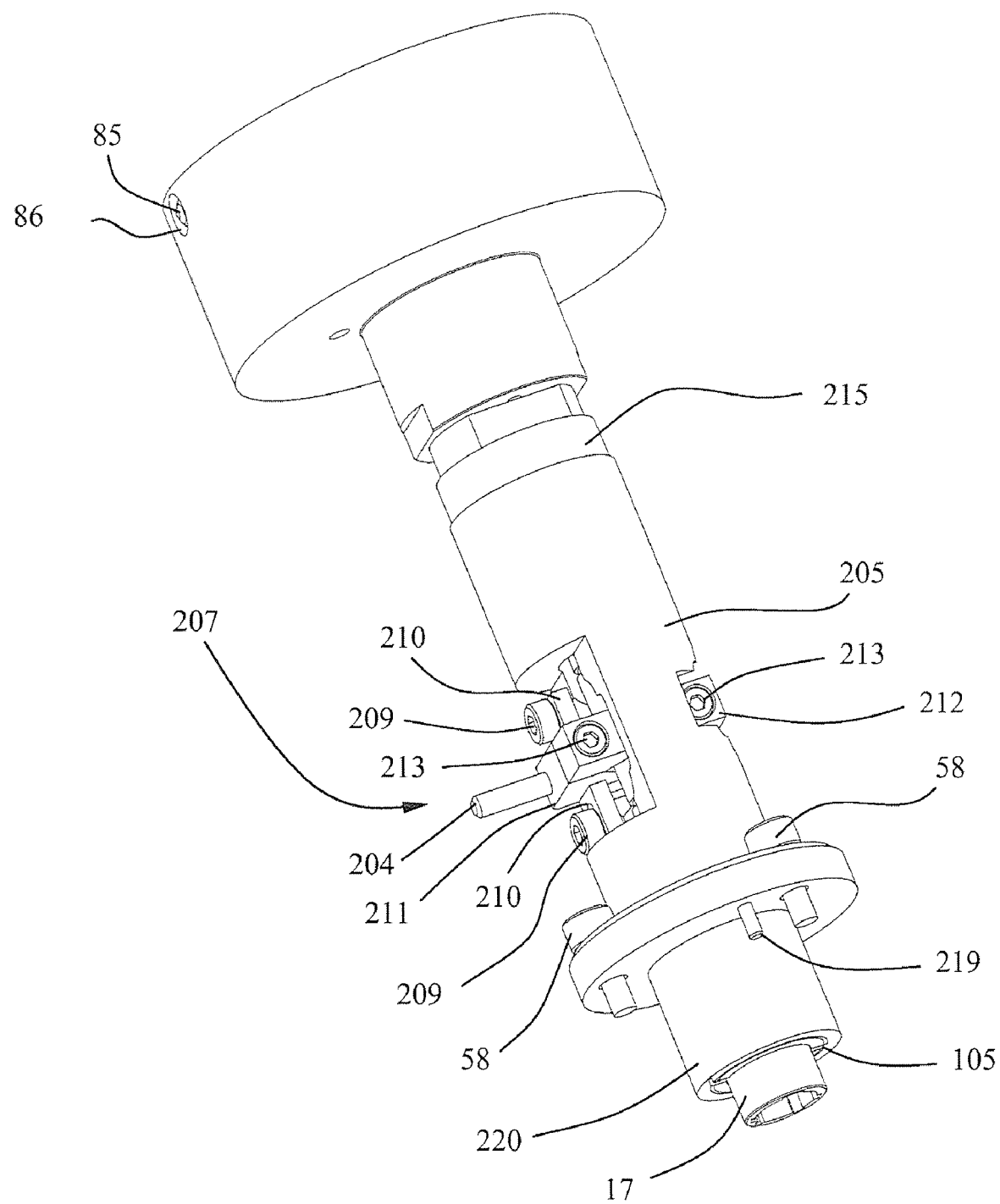
FIG. 13 shows a perspective view of a connection system and probe of the plug gauge of FIG. 12.
Figure 14:
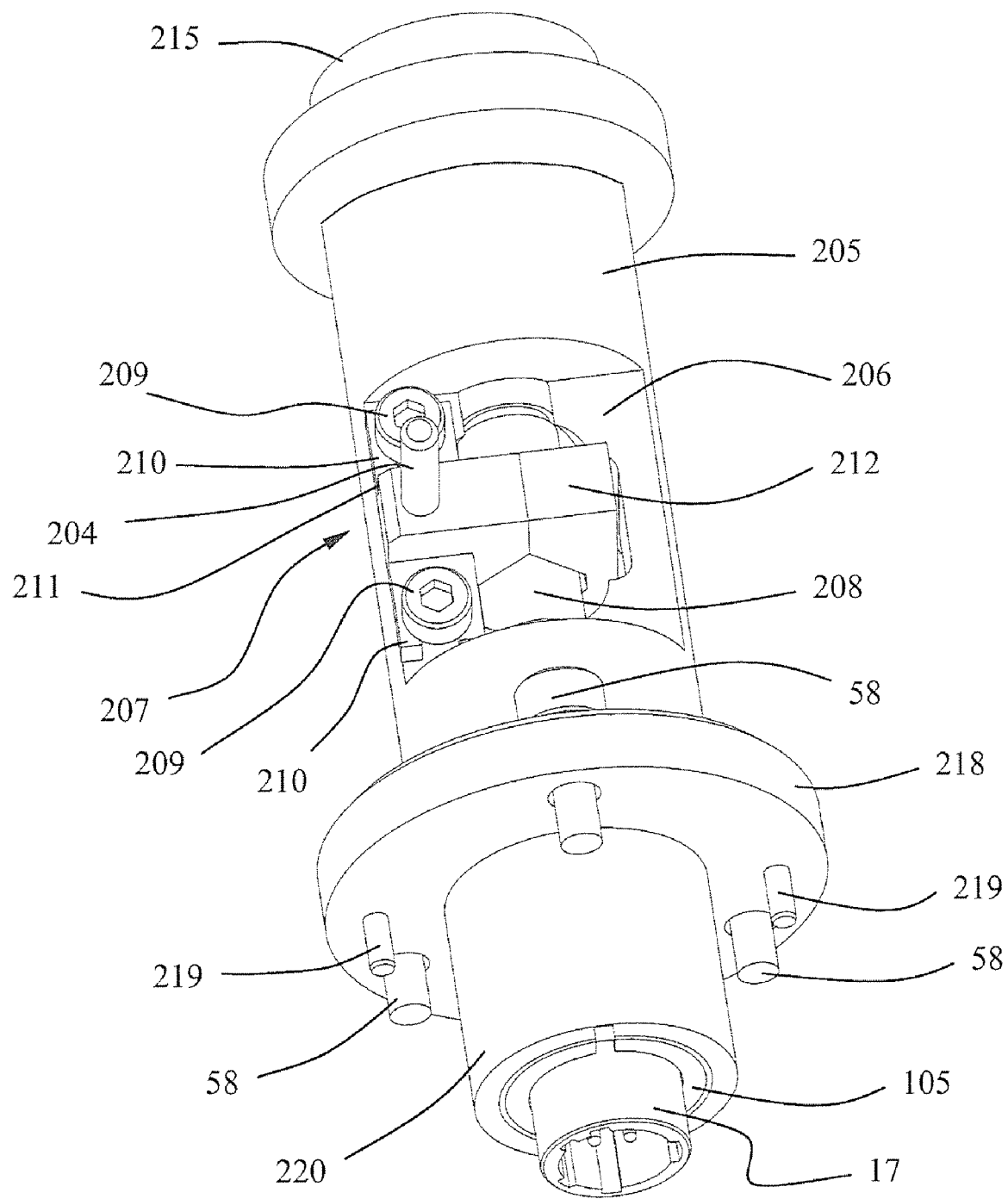
FIG. 14 shows a perspective view of the connection system of the FIG. 13 according to a different angular position and on a different scale with respect to FIG. 13.

The connection system 201, which is better visible in FIGS. 13 and 14, comprises the interface element 205 and a clamping device 207. The interface element 205 is hollow and cylindrical shaped, with an external portion of larger diameter, or flange 218, which includes mechanical references with two pins 219 and three holes for screws 58, spatially arranged as in the flange 8 of FIGS. 1-7 and in the flange 96 of FIGS. 8-11 for coupling to the cap 13 of the handle 2 in an univocal way. A second end portion 220 of the interface element 205, longitudinally opposite to the first end portion 215, is internally shaped for housing a probe-side connector 17, with an abutment surface and seats (not visible in the figures) for corresponding reference keys of the probe-side connector 17, substantially identical to those illustrated with reference to FIGS. 1-7 and 8-11. A ring nut 105 locks the probe-side connector 17 in abutment against the abutment surface. The reference keys of the probe-side connector 17 and the associated seats achieve a second antirotation system for the probe-side connector 17 substantially identical to that of the FIGS. 1-7 and 8-11.

As in the plug gauges of the FIGS. 1-7 and 8-11, the connectors 16 and 17 are prevented form rotating about the longitudinal axis of the plug gauge 200 with respect to the handle 2 and the interface element 205 respectively, and the connection system 201 achieves a main antirotation system which prevents the connectors 16 and 17 from mutually rotating about the longitudinal axis.

The interface element 205 further includes an opening 206 where there is positioned, in longitudinally adjustable way, the clamping device 207. The clamping device 207 includes C-shaped parts 210, with opposite longitudinal orientation, whereon there are engaged screws 209 which are in turn screwed into corresponding threaded holes achieved on the interface element 205 at the opening 206. As long as the screws 209 are loose, a longitudinal position of the clamping device 207 can be adjusted by means of the adjusting pin 204, that can be manually operated even when the protection element 202 is mounted, through the longitudinal slot 203. By tightening the screws 209, there is determined the longitudinal position of the clamping device 207. The clamping device 207 further includes a first 211 and a second 212 C-shaped clamping element for clamping a checking device, for example a known linear gauging head 208, housed within the interface element 206. More specifically, the linear gauging head 208 is referred and coupled to the interface element 207 by tightening the first 211 and the second 212 clamping element by means of two screws 213 coupled thereto. As a consequence, when the longitudinal position of the clamping device 207 is determined and the linear gauging head 208 is locked with respect to the clamping elements 211, 212, the longitudinal position of the linear gauging head 208 is determined as well.

Figure 15:
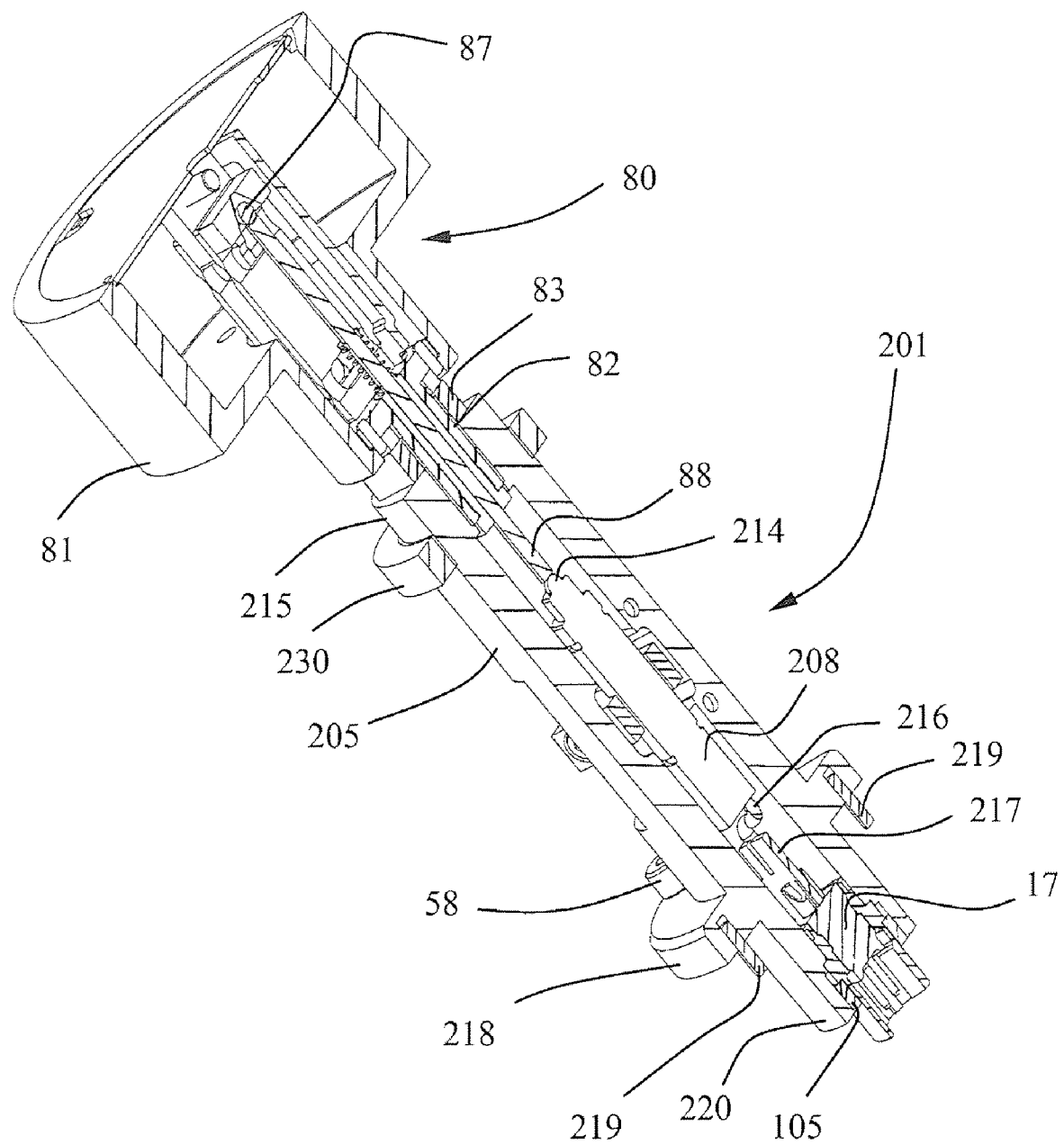
FIG. 15 shows a longitudinal cross-sectional perspective view of the connection system and probe of the plug gauge of FIG. 12, according to a different angular position and on a different scale with respect to FIG. 12.

As the linear gauging head 208 is of a known type, for the sake of simplicity, it is illustrated in simplified way in FIG. 15. It includes a feeler 214 and provides in a known way, by means of an inductive position transducer, electrical signals indicative of displacements of such feeler 214 through electrical wires 216 which are coupled by means of a printed circuit 217 to the probe-side connector 17. International patent application no. PCT/EP2007/051701 provides for examples of suitable linear gauging heads and a detailed explanation of their functioning.

Displacements of the feelers 85 along a measuring direction transversal to the longitudinal axis of the plug gauge 200 are transduced in a known way by the mechanical transmission system in displacements of the transmission rod 88 along the longitudinal axis. The linear gauging head 208, which is in contact with the transmission rod 88 through the feeler 214, provides for electrical signals representative of the displacements of the feelers 85.

As well as in the embodiment of the FIGS. 8-11, zero-setting operations are quick and convenient. Once the linear gauging head 208 has been locked between the clamping elements 211, 212 by means of the screws 213, the longitudinal position of the linear gauging head 208 can be advantageously adjusted by simply loosening the screws 209 and displacing the clamping device 207 by means of the adjusting pin 204. As soon as a zero condition of the linear gauging head 208 is achieved, the screws 209 are locked, so fixing the longitudinal position of the linear gauging head 208.

As previously seen with reference to the FIGS. 1-15, the connection systems utilized in the gauges of the present invention enable to obtain a rapid interchangeability between probe and handle, and at the same time high precision and resistance of the electrical and mechanical coupling.

The gauges hereinbefore described can be modified without departing from the scope of the invention.

The interface element 8 can be integral with the probe 6 and also the other gauge components can have different shape with respect to the one described and illustrated.

The connection systems between probe and handle have been illustrated with reference to manual plug gauges with wireless transmission for checking internal diametral dimensions, but can also be utilized for plug gauges, or gauges of different type, for example for checking external diameters, or shape errors, with cable transmission, also for automatic use on mechanical arms and machine tools. Moreover, there can be utilized probes for concurrently checking more than one cross-section of a same mechanical piece, as illustrated for example in the published International application no. WO 2006/037749 A1, including one or more armsets with parallelogram, or fulcrum cells.

One or more linear bushing or one or more axial bearings with recirculating balls (for example of the type illustrated in patent U.S. Pat. No. 6,760,980) can be used for guiding displacements of the spindle 95.

Checking apparatuses different from the gauges, for example including checking devices able to provide for information relating to the absolute dimensions of the parts to be checked, are within the scope of the invention as well.

The invention claimed is:

1. An apparatus for measuring and checking a mechanical piece comprising:
    a support and protection structure that defines a longitudinal axis of the apparatus and includes a first connector;
    a probe connected to the support and protection structure, that includes at least one armset with at least one feeler adapted for contacting the mechanical piece;
    at least one transducer adapted for generating electrical signals representative of displacements of said at least one feeler;
    a second connector adapted for cooperating with the first connector; and
    a mechanical interface element, connected in a removable way to at least one of said support protection structure and said probe and adapted to align and connect the probe to the support and protection structure,
    wherein said mechanical interface element is adapted to achieve a main antirotation system for preventing said first connector and said second connector from mutually rotating about the longitudinal axis.

2. An apparatus according to claim 1, wherein the mechanical interface element includes first and second mechanical references for corresponding seats of the probe and of the support and protection structure, respectively.

3. An apparatus according to claim 2, wherein said corresponding seats of the probe are achieved on a main element of said probe.

4. An apparatus according to claim 2, wherein the support and protection structure includes a closure element that defines said corresponding seats of said support and protection structure.

5. An apparatus according to claim 1, wherein said first and second connectors include references for the mutual mechanical reference.

6. An apparatus according to claim 1, including a first antirotation system between the first connector and the support and protection structure.

7. An apparatus according to claim 1, including a second antirotation system between the second connector and the probe.

8. An apparatus according to claim 7, wherein the second connector is coupled to the main element of the probe achieving said second antirotation system.

9. An apparatus according to claim 1, for checking internal diameters, including a wireless transmission system of the electrical signals of the transducer, said transmission system including at least one battery and an emitting device, connected to said transducer and contained in the support and protection structure.

10. An apparatus according to claim 9, wherein said transmission system is of the radio frequency type, and said emitting device is an aerial emitting device.

11. An apparatus according to claim 1, including a wireless transmission system for the electrical signals of the transducer.

12. An apparatus according to claim 1, wherein the probe houses said transducer.

13. An apparatus for measuring and checking a mechanical piece comprising:
    a support and protection structure that defines a longitudinal axis of the apparatus an includes a first connector;
    a probe that includes at least one armset with at least one feeler adapted for contacting the mechanical piece, and a mechanical transmission system;
    at least one transducer adapted for generating electrical signals representative of displacements of said at least one feeler;
    a second connector connected to said at least one transducer and adapted for being coupled to the first connector;
    a wireless transmission system for said electrical signals, including at least one battery and an emitting device; and
    a connection system between the support and protection structure and the probe, connected in a removable way to at least one of said support and protection structure and said probe,
    wherein the support and protection structure comprises a handle, the handle housing said at least one battery and said emitting device.

14. An apparatus according to claim 13, wherein said connection system is adapted to achieve an antirotation system adapted for preventing said first connector and said second connector from mutually rotating about the longitudinal axis.

15. An apparatus according to claim 13, wherein the connection system includes a mechanical interface element connected in a removable way to at least one of said probe and said support and protection structure.

16. An apparatus according to claim 15, wherein said mechanical interface element includes mechanical references for engaging with the support and protection structure.

17. An apparatus according to claim 13, including a first antirotation system between the first connector and the support and protection structure.

18. An apparatus according to claim 15, including a second antirotation system between the second connector and the mechanical interface element.

19. An apparatus according to claim 13, wherein said wireless transmission system is of the radio frequency type, and said emitting device is an aerial emitting device.

20. An apparatus for measuring and checking a mechanical piece comprising:
   a support and protection structure;
   a probe that includes at least one armset with at least one feeler adapted for contacting the mechanical piece, and a mechanical transmission system;
   at least one transducer adapted for generating electrical signals representative of displacements of said at least one feeler;
   a wireless transmission system for said electrical signals, including at least one battery and an emitting device arranged in said support and protection system; and
   a connection system between the support and protection structure and the probe, connected in a removable way to at least one of said support and protection structure and said probe.

21. An apparatus according to claim 20, wherein said at least one transducer is arranged in said connection system.

22. An apparatus according to claim 21, wherein said at least one transducer is an inductive transducer.

23. An apparatus according to claim 21, wherein said support and protection system comprises a handle, said connection system being connected in a removable way to at least one of said handle and said probe.

24. An apparatus according to claim 23, wherein said connection system is connected in a removable way to said probe.

25. An apparatus according to claim 23, wherein said handle houses said battery and said emitting device.

26. An apparatus according to claim 23, wherein said handle defines a longitudinal axis, said mechanical transmission system being adapted for transmitting displacements of said at least one feeler to said transducer.

27. An apparatus according to claim 26, wherein said mechanical transmission system is adapted for transmitting, along said longitudinal axis, displacements of said at least one feeler along a measuring direction transversal to the longitudinal axis.

28. An apparatus according to claim 27, wherein said at least one feeler comprises at least two feelers, and wherein said mechanical transmission system is adapted for transmitting, along said longitudinal axis, mutual displacements of said at least two feelers on a plane transversal to the longitudinal axis.

29. An apparatus according to claim 20, wherein said transmission system is a radio frequency type transmission system.

30. An apparatus according to claim 20, wherein said support and protection system comprises a handle housing said battery and emitting device, said connection system including a mechanical interface element connected in a removable way to the probe, the transducer being an inductive transducer and being housed in the mechanical interface element, the transmission system being a radio frequency type transmission system.

* * * * *